Sept. 14, 1926.  A. HÖLAAS  1,599,469
SHAM MOTOR CYCLE FOR AMUSEMENT PURPOSES
Filed August 4, 1925
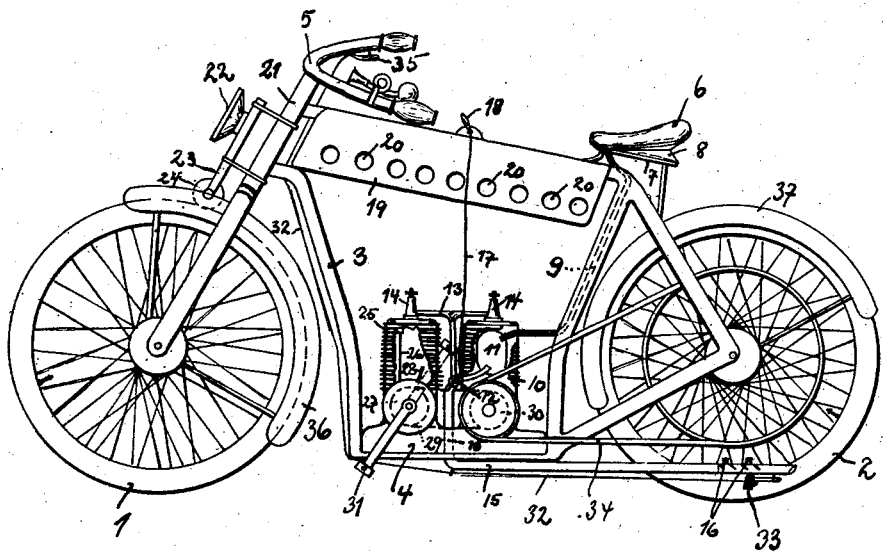
INVENTOR.
A. HÖLAAS.
By Marks & Clerk
attys Patented Sept. 14, 1926.

1,599,469

UNITED STATES PATENT OFFICE.

AGNAR HÖLAAS, OF BERLIN, GERMANY, ASSIGNOR TO JOHANNA KLEIN, OF GROSS-KORIS, GERMANY.

SHAM MOTOR CYCLE FOR AMUSEMENT PURPOSES.

Application filed August 4, 1925. Serial No. 48,164.

This invention relates to a sham motor cycle for amusement purposes, the main feature of which consists in this, that a compressed air system is provided in the cycle, which by means of separate valves operates whistles, blowing devices and the like.

The invention further consists in a compressed air system being provided in the cycle, which by means of separate valves operates whistles, blowing devices and the like, the saddle being in the form of bellows, so as to act as the pressure producing means.

One of the cylinders of the sham motor is utilized as a reservoir for the compressed air system, formed by a rubber ball within the said cylinder.

In addition to the combination with a compressed air system provided in the cycle, which by means of separate valves operates whistles, blowing devices and the like, of other means having a comic effect may be provided, such as a petrol tank having a series of holes for the reception of fireworks, for instance crackers and the like, and spark producing devices for exploding the fireworks or a revolver below the exhaust pipe operated by means of a pull member.

In the accompanying drawing a constructional example of the invention is illustrated, the figure showing a motor cycle partly in side elevation and partly in section.

1 and 2 are the two wheels. 3 is the frame of the motor cycle, 4 the engine and 5 the handle bar and 6 the saddle. Under the saddle and fixed to the same and the supporting plate 7 is a pumping device 8, which for instance has the form of a pair of bellows. The intake valve of the pumping device is in the supporting plate 7. The compressed air is withdrawn from the forward end of the pumping device and is conveyed through a flexible tube 9, which preferably passes through a tube of the frame to the rear cylinder 10 of the engine 4. In this cylinder is a rubber ball 11, which is constructed in a known manner to form an air reservoir 11. The air reservoir 11 is provided with an inlet valve at the point of entrance of the flexible tube 9. The compressed air is distributed from the air reservoir 11 to the various points, where it is to be used. By means of the valve 12 compressed air is conveyed either through the T-shaped tube 13 to the two trill whistles 14, which are made to imitate sparking plugs, or downwards through the sham exhaust pipe 15, into the outlet end of which fine powder, such as flour or the like, may be introduced from the small containers 16. The powder is carried along by the current of air thus produced and forms a cloud like smoke behind the travelling cycle. The valve is operated by means of the cord 17 and the hand-lever 18. The imitation petrol tank 19, which is mounted on the horizontal upper tube of the frame is provided with a series of holes 20. In the petrol tank fireworks such as crackers or the like are caused to explode by any known spark producing device. The exploding fireworks fly through the holes 20 and create the impression that the petrol tank is exploding. On the forward supporting tube 21 of the frame 3 of the cycle is a signalling device. This device consists of a diaphragm 22 mounted in a funnel, which diaphragm is caused to vibrate by means of a shaft 23 and a small wheel 24 resting on the tyre of the front wheel 1 of the cycle. By suitably tuning the signalling device, very comic signals can be produced. With tne object of imitating the noise of an engine a vertical diaphragm 26 is stretched in the forward cylinder 25. On a small drum 27 is a pin 28, which, on the drum 27 rotating, strikes against the diaphragm 26. Through the rapid succession of blows given by the pin 28 against the diaphragm 26 a noise is produced similar to that of an engine. The drum 27 is driven by a small belt 29 from the pulley 30. This pulley is itself driven by the belt 34 of the motor cycle, which belt is driven from the rear wheel 2 of the motor cycle. The cranks are marked 31. Below the rear outlet of the exhaust pipe 15 a small pistol 33 is fixed. To the trigger of the pistol 33 is connected a cord 32 extending along the lower side of the exhaust pipe 15. The cord 32 passes in front of the engine 4 along the frame of the handle bar 5, where it is connected to an operating lever 35. By pressing the lever 35 the trigger of the pistol 33 is actuated and the revolver discharged. The firing of the pistol thus caused gives an imitation of the so-called back-firing of the engine. 36 and 37 are the two mud-guards of the wheels 1 and 2.

The sham motor cycle described above is intended as a trick device for comic artistes. The cycle is intended to create the appearance of a motor cycle and to reproduce noises characteristic of a motor cycle, perhaps in a somewhat exaggerated manner. By the production of apparent clouds of smoke, the explosion of fireworks in the petrol tank, the firing of the small pistol under the exhaust pipe and the like, the impression of an intractable motor cycle is produced.

What I claim is:—

1. A sham motor cycle for amusement purposes comprising in combination a cycle, a compressed air system incorporated in the body of the cycle, and having separate valves in the compressed air system and devices connected with the said compressed air system and capable of being operated by the compressed air and of being controlled by the said valves as set forth.

2. A sham motor cycle for amusement purposes comprising in combination a cycle, a compressed air system incorporated in the body of the cycle, and having separate valves in the compressed air system and devices connected with the said compressed air system and capable of being operated by the compressed air and of being controlled by the said valves, the said compressed air system comprising a saddle in the form of bellows capable of acting as an air compressor, as set forth.

3. A sham motor cycle for amusement purposes, as described in claim 2, and having a sham motor cylinder, a rubber ball within the said sham motor cylinder, and a connecting pipe between the said rubber ball and saddle, as set forth.

In testimony whereof I have signed my name to this specification.

AGNAR HÖLAAS.